United States Patent [19]
Stutzenberger

[11] Patent Number: 5,908,023
[45] Date of Patent: Jun. 1, 1999

[54] METHOD AND APPARATUS FOR ENRICHING THE OXYGEN CONTENT IN THE INTAKE AIR OF AN INTERNAL COMBUSTION ENGINE

[75] Inventor: Heinz Stutzenberger, Vaihinger, Germany

[73] Assignee: Robert Bosch GmbH, Stuttgart, Germany

[21] Appl. No.: 09/039,560

[22] Filed: Mar. 16, 1998

[30] Foreign Application Priority Data

Mar. 15, 1997 [DE] Germany .................. 197 10 840

[51] Int. Cl.$^6$ ....................................... F02M 9/00
[52] U.S. Cl. ................................. 123/704; 123/585
[58] Field of Search ....................... 123/585, 704, 123/567

[56] References Cited

U.S. PATENT DOCUMENTS

| | | | |
|---|---|---|---|
| 4,531,490 | 7/1985 | Kishi et al. | 123/339.15 |
| 4,538,578 | 9/1985 | Suzuki et al. | 123/478 |
| 4,727,849 | 3/1988 | Nishida et al. | 123/704 |
| 4,790,286 | 12/1988 | Nishida et al. | 123/704 |
| 5,636,619 | 6/1997 | Poola et al. | 123/585 |
| 5,649,517 | 7/1997 | Poola et al. | 123/585 |

FOREIGN PATENT DOCUMENTS 0095150  5/1985  Japan ................ 123/704

*Primary Examiner*—Henry C. Yuen
*Assistant Examiner*—Hai Huynh
*Attorney, Agent, or Firm*—Walter Ottesen

[57] ABSTRACT

The invention is directed to a method and an arrangement for enriching the oxygen content in the intake air of an internal combustion engine. To enrich the oxygen content, air is conducted through a membrane which is primarily permeable for oxygen molecules. This membrane is mounted in an enrichment channel which opens into the intake channel of the engine. The oxygen content in the intake channel is continuously detected by at least one sensor device. On the one hand, a reduction of the toxic emissions of the engine is provided while, on the other hand, an increase in the power of the engine is simultaneously provided. This is achieved with a drivable actuator device which changes the concentration of the inducted air as well as the oxygen-enriched air in dependence upon the detected oxygen content.

9 Claims, 1 Drawing Sheet

METHOD AND APPARATUS FOR ENRICHING THE OXYGEN CONTENT IN THE INTAKE AIR OF AN INTERNAL COMBUSTION ENGINE

FIELD OF THE INVENTION

The invention relates to a method for enriching the oxygen content in the intake air of an internal combustion engine. The enrichment of the oxygen content takes place in that air is guided through a membrane permeable only for oxygen molecules. This membrane is mounted in an enrichment channel opening into the intake channel. The oxygen content in the intake channel is continuously detected by at least one sensor device.

BACKGROUND OF THE INVENTION

A method and an arrangement for reducing the toxic substances in combustion exhaust gases wherein a gas having an increased oxygen content is supplied to the inducted air is disclosed, for example, in U.S. patent application Ser. No. 08/682,593, filed Feb. 2, 1996, and incorporated herein by reference. The oxygen-enriched gas is obtained in that air is guided through a membrane which is permeable only for oxygen molecules and is mounted in a chamber With this kind of an oxygen enrichment of the air supplied to the engine, the exhaust-gas temperature is increased and therefore the start time of the catalytic converter is reduced. This start time is that time which elapses before the catalytic converter reaches its operating temperature and its full operational effect. At the same time, the fuel conversion in the engine is improved so that the raw emissions of carbon monoxide and hydrocarbons (CO, HC) are reduced. Furthermore, the nitrogen content during combustion is reduced whereby less nitrogen oxide is produced which must be catalytically converted to reduce the burden to the environment.

In a method and an arrangement of this kind, it is problematical that the oxygen content of the oxygen-enriched gas (which is supplied to the intake air) cannot be exactly determined so that, for example, an exact control of the combustion processes is not possible by means of an engine control known per se. Rather, the control must take place indirectly, that is, by known sensor means and engine controls which, however, requires a considerable intervention into the control algorithms of the engine control.

An arrangement for controlling an exhaust-gas feedback is disclosed in U.S. Pat. No. 4,905,564. In this arrangement, the control of the fed-back exhaust gas is made possible via an exhaust-gas feedback valve. In this arrangement, an oxygen probe is provided which detects the oxygen content in the intake channel. An internal combustion engine is controlled in dependence upon the detected sensor signal. An arrangement of this kind does not make possible the control of the oxygen content. Furthermore, the arrangement does not make possible an oxygen enrichment because the fed-back exhaust gas contains less oxygen than the usual inducted air. Such an exhaust-gas feedback serves essentially to reduce the nitrogen oxide (NO) as known per se which is effected in that the fed-back exhaust gas (that is, an inert gas) is admixed to the inducted air. In this way, the combustion temperature is reduced and less nitrogen oxide is generated. A reduction of the toxic emission while simultaneously increasing the power of the engine is not possible with an arrangement of this kind.

SUMMARY OF THE INVENTION

In view of the above, it is an object of the invention to provide a method for enriching the oxygen content in the inducted air of an internal combustion engine in such a manner that a reduction of the toxic emissions of the engine is made possible while, on the other hand, an increase of the power of the engine is made possible at the same time.

The method of the invention is for enriching the oxygen content in the intake air of an internal combustion engine having an intake channel. The method includes the steps of: providing an enrichment channel opening into the intake channel; passing ambient air into the enrichment channel and conducting the ambient air through a membrane mounted in the enrichment channel to obtain oxygen enriched air, the membrane being permeable primarily for oxygen molecules; continuously detecting the oxygen content in the intake channel utilizing sensor means; and, utilizing drivable actuator means to change the concentration of the inducted air and the oxygen enriched air in dependence upon the oxygen content detected by the sensor means.

In the arrangement of the invention, the change of the concentrations for the inducted air as well as for the oxygen-enriched air is achieved by at least one controllable actuator in dependence upon the detected oxygen content. This has the especially significant advantage that a continuous control of the oxygen content of the intake air supplied to the engine is possible so that the engine can always be operated in an operating state which, on the one hand, makes possible a reduction of the emission of toxic substances and, on the other hand, makes possible an optimal yield with respect to power.

With the controlled increase of the oxygen content of the intake air, a reduction of the carbon monoxide and hydrocarbon emissions is possible in the manner described above and the power density is increased so that the oxygen is supplied to the combustion operation. More fuel can be injected because of the increased oxygen content for a limited swept volume which is present for each engine. In this way, the power yield is increased. It is also especially advantageous that the oxygen can be obtained on board the vehicle via the membrane which is enriched in the enriching channel.

In principle, different sensor devices can be utilized to detect the oxygen content. In an advantageous embodiment, the oxygen content is detected by at least one oxygen probe which is mounted rearward of the at least one actuator. In this way, the oxygen content of the intake air supplied to the engine can be detected in an especially simple manner.

In addition, a pressure sensor can be provided especially with respect to a correction of the oxygen content detected by the oxygen probe. With this pressure sensor, the pressure is detected in the intake channel rearward of the actuator.

The invention is also directed to an arrangement for enriching the oxygen content in the intake air of an internal combustion engine. This arrangement includes an enrichment channel, which can be subjected to ambient air and which opens into the intake channel of the engine. At least one membrane is mounted in the enrichment channel and at least one sensor device is provided in the intake channel to detect the oxygen content. The membrane is permeable only for oxygen molecules.

With respect to the above, it is an object of the invention to provide an arrangement for enriching the oxygen content in the intake air of an internal combustion engine which makes possible a controlled oxygen enrichment of the intake air in a simple manner.

The arrangement of the invention is for enriching the oxygen content of the intake air of an internal combustion engine having an intake channel. The arrangement includes: an enrichment channel for receiving ambient air and opening into the intake channel; a membrane permeable primarily for oxygen molecules and being mounted in the enrichment channel to obtain oxygen-enriched air for admixing with the intake air; sensor means for detecting the oxygen content in the intake channel; actuator means for metering the oxygen-enriched air; and, control means for controlling the actuator means to meter the oxygen-enriched air in dependence upon the oxygen content detected by the sensor means.

The metering of oxygen-enriched air via the controlled drivable actuator in dependence upon the oxygen content, which is detected by the sensor device, has the especially significant advantage that a precise control of the supply of oxygen-enriched air is possible with relatively little technical complexity.

With respect to the sensor device, the most different kind of sensor device can, in principle, be considered. Advantageously, the sensor device can however be an oxygen probe which is mounted rearward of the actuator. This oxygen probe makes possible a precise determination of the oxygen content of the inducted air.

Furthermore, the above-mentioned sensor device can include an additional pressure sensor mounted rearward of the actuator. In this way, especially the partial pressure of the oxygen present in the intake air can be determined. A pressure sensor of this kind can simultaneously be used to determine the load signal of the engine.

The most different embodiments are conceivable with respect to the configuration of the actuator. In one embodiment, the actuator is a flap closing the opening of the enrichment channel.

In an especially advantageous embodiment, a separate metering of the oxygen-enriched air as well as the intake air is possible and, in this embodiment, the actuator includes a throttle flap mounted in the intake channel and a throttle flap mounted in the enrichment channel.

The sensor device and the actuator are electrically connected to a control apparatus. The control apparatus can, for example, be part of an engine control of the internal combustion engine which is anyway present.

BRIEF DESCRIPTION OF THE DRAWING

The invention will now be described with reference to the single FIGURE (FIG. 1) of the drawing which shows a schematic of the arrangement according to the invention for enriching the oxygen content in the intake air of an internal combustion engine.

DESCRIPTION OF THE PREFERRED EMBODIMENTS OF THE INVENTION

Figure 1:
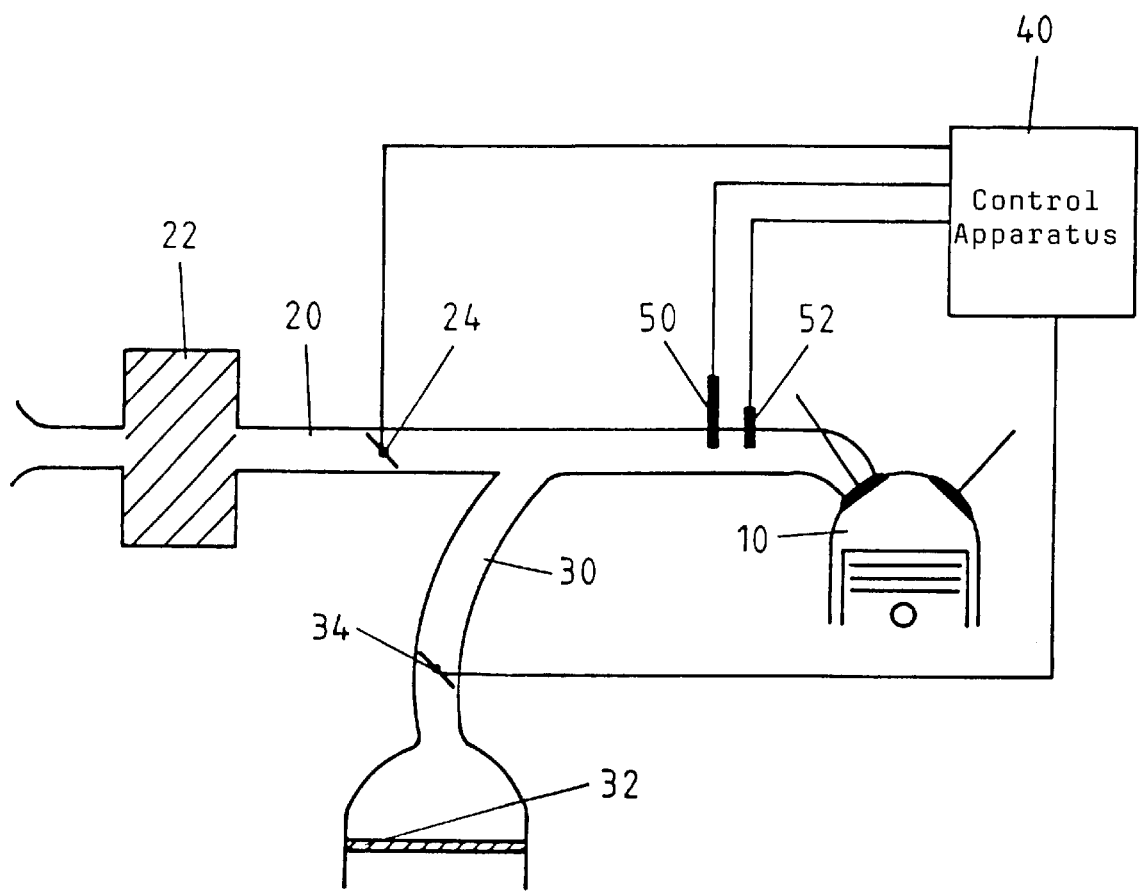

The method for enriching the oxygen content in the intake air of an internal combustion engine is best explained in connection with an arrangement for carrying out the method of the invention. An arrangement for enriching the oxygen content in the intake air of an internal combustion engine 10 includes an intake channel 20 and an enrichment channel 30.

The intake channel 20 is closed at the input end thereof by an air filter 22 known per se. This filter prevents dust particles and the like from reaching the engine 10. In the intake channel 20, a throttle flap 24 is mounted which can be driven by a control apparatus 40. With the throttle flap 24, the intake channel 20 can be entirely or partially closed.

The enrichment channel 30 opens into the intake channel 20. Here too, a throttle flap 34 is provided which can be driven by control apparatus 40. With the throttle flap 34, the enrichment channel 30 can be entirely or partially closed.

A membrane 32 is mounted in the enrichment channel 30 and is permeable especially for oxygen molecules. Air is drawn through this membrane 32 by the underpressure present in the intake channel. This air is enriched with oxygen at the output end, that is, in the enrichment channel 30. A blower or a compressor (not shown) can be provided forward of the membrane 32 in the enrichment channel 30 to increase the efficiency. The blower or compressor exchanges the air, which is enriched by oxygen, forward of the membrane 32.

An oxygen probe 50 as well as a pressure sensor 52 are provided in the intake channel 20 downstream of the opening of the enrichment channel 30. With the oxygen probe 50, the oxygen content in the intake channel 20 is detected and, with the pressure sensor 52, the pressure present in the intake channel 20 is detected. The detected oxygen content and pressure are transmitted to the control apparatus 40.

The control apparatus 40 can, for example, be an engine control known per se. In the control apparatus 40, the oxygen content of the intake air to be supplied to the engine 10 is determined from the above detected oxygen and pressure and is precisely adjusted by driving the throttle flaps 24 and 34. With this oxygen increase, the toxic substance emissions are reduced and an increase of the power of the engine 10 is made possible.

It is understood that the foregoing description is that of the preferred embodiments of the invention and that various changes and modifications may be made thereto without departing from the spirit and scope of the invention as defined in the appended claims.

What is claimed is:

1. A method for enriching the oxygen content in the intake air of an internal combustion engine having an intake channel, the method comprising the steps of:

providing an enrichment channel opening into said intake channel;

passing ambient air into said enrichment channel and conducting said ambient air through a membrane mounted in said enrichment channel to obtain oxygen enriched air, said membrane being permeable primarily for oxygen molecules;

continuously detecting the oxygen content in said intake channel utilizing sensor means; and, utilizing drivable actuator means to change the concentration of said inducted air and said oxygen enriched air in dependence upon the oxygen content detected by said sensor means.

2. The method of claim 1, comprising the further step of providing an oxygen probe as part of said sensor means and placing said oxygen probe downstream of said actuator means for detecting said oxygen content.

3. The method of claim 2, comprising the further step of providing a pressure sensor as part of said sensor means and placing said pressure sensor downstream of said actuator means to detect the pressure present in said intake channel.

4. An arrangement for enriching the oxygen content of the intake air of an internal combustion engine having an intake channel, the arrangement comprising:

an enrichment channel for receiving ambient air and opening into said intake channel;

a membrane permeable primarily for oxygen molecules and being mounted in said enrichment channel to obtain oxygen-enriched air for admixing with said intake air;

sensor means for detecting the oxygen content in said intake channel;

actuator means for metering said oxygen-enriched air; and, control means for controlling said actuator means to meter said oxygen-enriched air in dependence upon said oxygen content detected by said sensor means.

5. The arrangement of claim 4, said sensor means and said actuator means being electrically connected to said control means.

6. The arrangement of claim 5, said sensor means including an oxygen probe mounted downstream of said actuator means.

7. The arrangement of claim 6, said sensor means further including a pressure sensor mounted downstream of said actuator means.

8. The arrangement of claim 4, said actuator means including a throttle flap for opening and closing said enrichment channel.

9. The arrangement of claim 4, said actuator means including a first throttle flap mounted in said intake pipe and a second throttle flap mounted in said enrichment channel.

* * * * *